(12) United States Patent
Chow et al.

(10) Patent No.: US 8,882,043 B2
(45) Date of Patent: Nov. 11, 2014

(54) LANDING GEAR ASSEMBLY

(75) Inventors: Leung Choi Chow, Bristol (GB);
Christopher Neil Wood, Cheshire (GB)

(73) Assignee: Airbus UK Limited, Filton, Bristol (GB)

( * ) Notice: Subject to any disclaimer, the term of this patent is extended or adjusted under 35 U.S.C. 154(b) by 889 days.

(21) Appl. No.: 10/552,097

(22) PCT Filed: Apr. 7, 2004

(86) PCT No.: PCT/GB2004/001538
§ 371 (c)(1),
(2), (4) Date: Feb. 21, 2006

(87) PCT Pub. No.: WO2004/089744
PCT Pub. Date: Oct. 21, 2004

(65) Prior Publication Data
US 2006/0243856 A1   Nov. 2, 2006

(30) Foreign Application Priority Data

Apr. 7, 2003  (GB) .................................. 0308004.1
Apr. 8, 2003  (EP) .................................. 03252215

(51) Int. Cl.
| | | |
|---|---|---|
| B64C 1/38 | (2006.01) | |
| B64C 23/00 | (2006.01) | |
| B64C 1/40 | (2006.01) | |
| B60B 21/10 | (2006.01) | |
| B64C 25/36 | (2006.01) | |
| B60B 37/04 | (2006.01) | |
| B60B 3/08 | (2006.01) | |
| B60B 23/10 | (2006.01) | |
| B60B 7/00 | (2006.01) | |
| B64C 25/00 | (2006.01) | |

(52) U.S. Cl.
CPC ................. *B64C 1/38* (2013.01); *B60B 21/106* (2013.01); *B60B 2900/133* (2013.01); *B64C 2025/003* (2013.01); *B64C 1/40* (2013.01); *B64C 25/36* (2013.01); *B60B 37/04* (2013.01); *B60B 3/08* (2013.01); *B60B 23/10* (2013.01); *B60B 7/0026* (2013.01); *B64C 23/00* (2013.01)
USPC .................. 244/130; 244/100 R; 244/102 R; 244/1 N

(58) Field of Classification Search
USPC ...... 244/130, 131, 1 N, 100 R, 103 R, 103 S; 301/37.22–37.25
See application file for complete search history.

(56) References Cited

U.S. PATENT DOCUMENTS 1,743,074 A  *  1/1930  Roth .......................... 244/103 R
1,968,005 A       7/1934  Swain
(Continued)

FOREIGN PATENT DOCUMENTS

DE     43 01 778 A1    7/1994
EP     0 119 149 A2    9/1984
(Continued)

*Primary Examiner* — Joshua J Michener
(74) *Attorney, Agent, or Firm* — Patterson Thuente Pedersen, P.A.

(57) ABSTRACT

An aircraft landing gear (9) includes a wheel (1) having a wheel rim (3) on which a tire (4) is held. The gap (6) between the rim (3) and tire (4) is bridged and covered by a sealing element (7), which thereby presents a smooth surface to the air flowing over the wheel during flight of the aircraft (8). Thus, noise that would otherwise be generated by the interaction of air and the parts of the wheel (1) and/or tire (4) defining the gap (6) is reduced. Such noise reduction benefits may also be achieved by providing a tire (4) and wheel (1) so shaped that there is no gap (6) between the tire (4) and wheel rim (3).

16 Claims, 5 Drawing Sheets

(56) References Cited

U.S. PATENT DOCUMENTS

| | | | |
|---|---|---|---|
| 1,969,088 A | | 8/1934 | Maranville |
| 1,972,216 A | * | 9/1934 | Dowty ........................ 301/37.31 |
| 2,012,449 A | | 8/1935 | Hamilton |
| 2,296,671 A | | 9/1942 | Hollerith |
| 3,089,731 A | * | 5/1963 | Barnes ........................ 301/37.22 |
| 3,133,717 A | * | 5/1964 | Hartel ........................ 244/103 R |
| 3,187,797 A | * | 6/1965 | Fletcher et al. ............... 152/154 |
| 3,430,896 A | * | 3/1969 | Labrecque ................ 244/103 R |
| 3,983,918 A | * | 10/1976 | French ......................... 152/520 |
| 4,235,271 A | * | 11/1980 | Olsen et al. ................... 152/186 |
| 4,434,830 A | | 3/1984 | Landers et al. |
| 4,790,362 A | * | 12/1988 | Price ............................. 152/153 |
| 5,100,083 A | * | 3/1992 | Large et al. ............. 244/102 SS |
| 5,591,282 A | * | 1/1997 | Weber et al. .................. 152/456 |

FOREIGN PATENT DOCUMENTS

| | | |
|---|---|---|
| GB | 395150 | 6/1932 |
| GB | 438968 | 5/1934 |
| GB | 1 515 239 | 6/1978 |
| GB | 286313 | 3/1982 |

\* cited by examiner

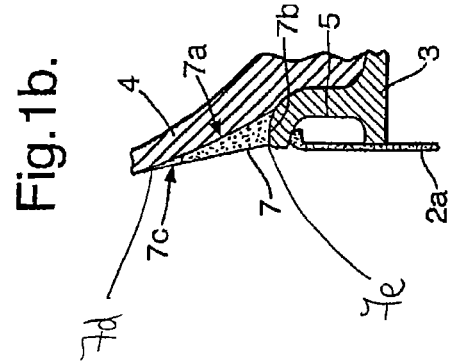
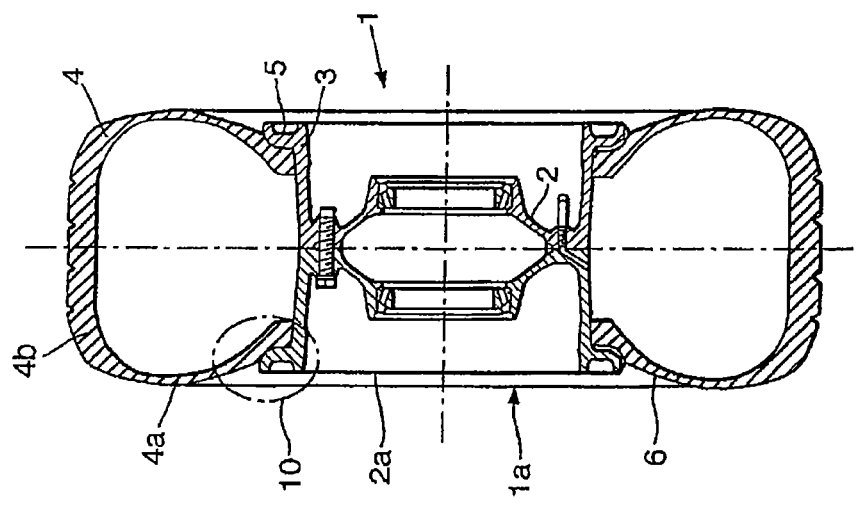

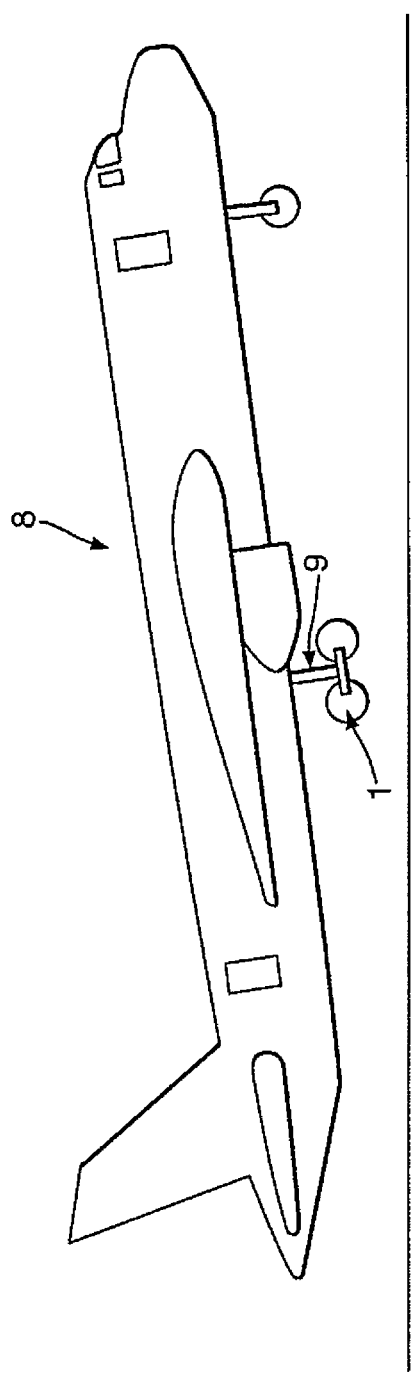

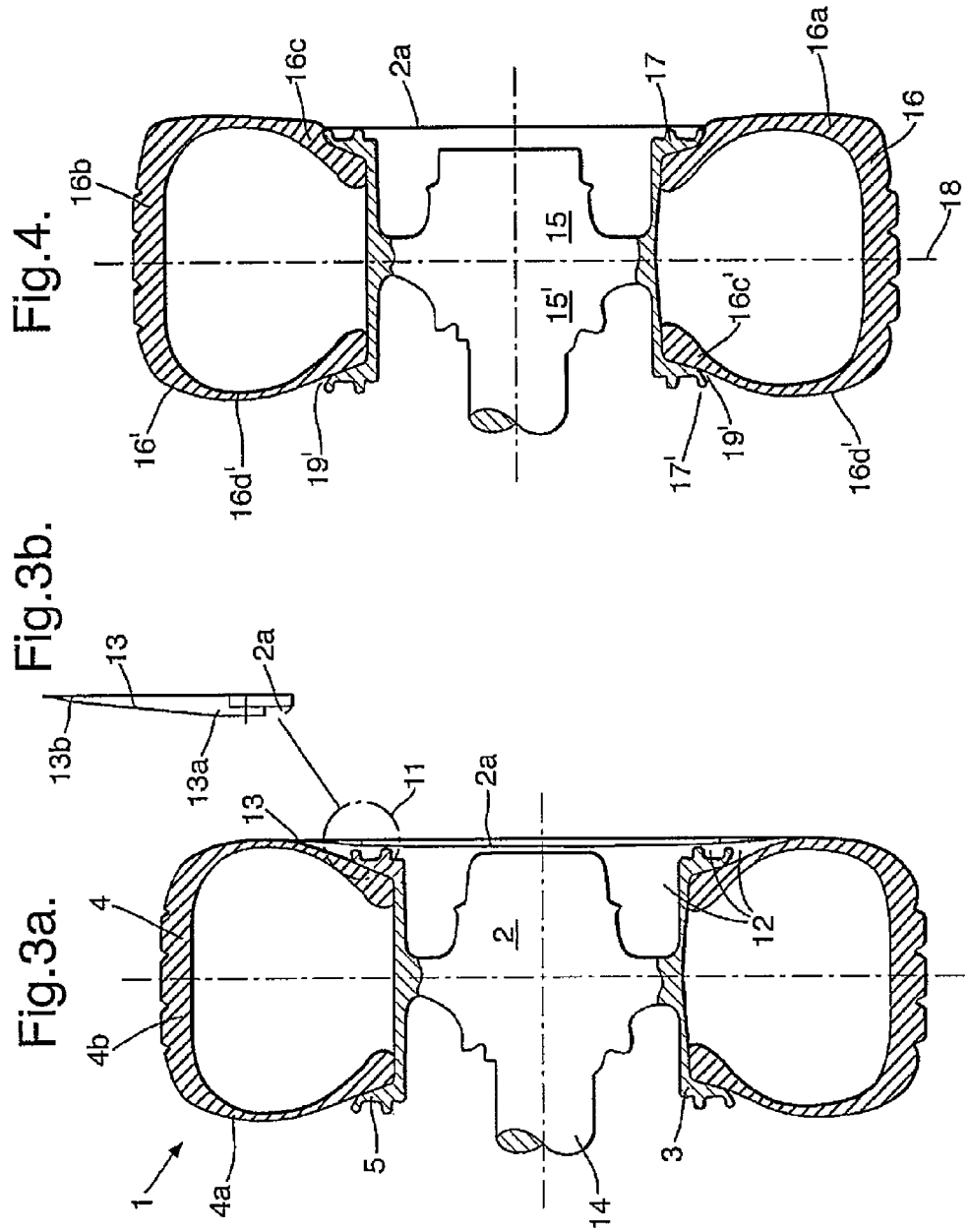

LANDING GEAR ASSEMBLY

The present invention relates to reducing noise caused by an aircraft landing gear. In particular, the invention relates to landing gear designed to reduce the noise generated by the interaction of the wheel of a landing gear and the air flowing past it during the approach of the aircraft when landing.

It is desirous to reduce the noise generated by aircraft, for example, to lessen disruption or inconvenience, resulting from aircraft noise, caused to the public on the ground near airports. A significant amount of noise is generated by the interaction of the aircraft and the air flowing past it, which results in turbulent flows and consequently noise. It is particularly important to reduce noise created during approach of the aircraft on landing. During approach, a significant contribution to the amount of noise that the aircraft makes is made by the landing gear, which is typically deployed early for landing for safety reasons. The deployment of landing gear will increase drag and assist deceleration of the aircraft. One source of noise is the wheel of the landing gear. During take-off, noise from the landing gear is a less significant factor because engine noise is generally greater and because the landing gear is generally stowed at the earliest opportunity to reduce drag and aid take-off. During normal flight, the landing gear of an aircraft is typically stowed in a landing gear bay, the bay being closed off by doors so that no part of the landing gear is subjected to the air flow.

It is an aim of the present invention to provide a landing gear that generates less noise compared to a landing gear of the same size that has not been adapted, designed or manufactured in accordance with the present invention.

According to the invention there is provided an aircraft comprising a landing gear including a wheel having a rim around which there is mounted a tyre, wherein the region at the junction between the tyre and the rim is shaped such that on at least one side of the wheel, during use of the landing gear on an aircraft when airborne and the landing gear is in a position ready for landing of the aircraft, the surface of said region interfaces smoothly with the surfaces, presented to the airflow, of both the tyre and the wheel. Thus, noise resulting from the interaction of the landing gear and the airflow during approach of the aircraft on landing may be reduced as a result of the gap, which would otherwise exist between the tyre and the rim, being closed.

It has previously been proposed to provide a landing gear including a wheel comprising a wheel rim, a tyre, and a hub cap that covers various voids. However, in that proposal the hub cap has not covered all such voids and in particular there may be a significant gap defined between the wheel rim and tyre. Such a landing gear could create significant noise as a result of the interaction of the parts of the wheel defining that gap and the air flowing past the wheel. Thus the noise caused by the interaction of the air and the wheel, caused during the approach when landing, may be reduced by means of providing a wheel according to the present invention.

British Patent Application published under number 395,150 describes a fairing for an aircraft wheel, the fairing comprising a metal disc portion and a removable rubber ring, the fairing extending from the hub of the wheel to the tyre. The rubber part of the fairing needs to be removed to allow inspection of the tyre. The fairing described in that patent specification has been designed for the purpose of streamlining the airflow over the wheel for the purpose of reducing drag and not for the purpose of noise reduction. For an aircraft that has a landing gear that is fixed in position, the landing gear should ideally be designed to minimise drag. If however, the landing gear is able to be moved to a stowed position, out of the airflow, there is no similar motivation to reduce drag. Moreover, in such cases there are advantages in having a landing gear that has a relatively high drag, because the landing gear may, when deployed, improve the rate of deceleration of the aircraft during the approach on landing. Even though there is no disclosure of any aircraft landing gear in GB 395,150, it might therefore be concluded that the wheel of GB 395,150 was designed for use on a fixed landing gear, which is thus not able to be moved out of the airflow It will be appreciated that the noise generated by an aircraft wheel during approach on landing is generally as a result of the airflow interacting with the wheel and that the wheel will typically not be rotating during approach on landing.

Advantageously, the wheel including the rim, tyre and said region, is designed, modified and/or configured to reduce, in use, the amount of turbulent air flow generated in said region of the wheel. Advantageously, the wheel including the rim, tyre and said region, is designed, modified and/or configured to streamline, in use, the flow of air past the wheel. Said region is preferably so shaped that it does not include any substantial portion that is concave (when viewed from outside of the wheel) when the aircraft is airborne. Said region is preferably so shaped that it is substantially flat and/or convex (when viewed from outside of the wheel) when the aircraft is airborne. Thus, there need be no gap between the wheel rim and the tyre, when the region is shaped in accordance with these preferred features of the invention. Having no such gap reduces the noise created by the wheel when compared with otherwise identical wheels having such gaps. Such gaps are generally concave in shape and have edges where different surfaces meet, such edges also contributing to unwanted noise.

Said region may be defined by a separate component part of the wheel. Said region may be defined by a sealing element, which bridges a gap between the wheel rim and the tyre. The sealing element may for example be provided in the form of a separate component. The sealing element may for example be in the form of a soft rubber pad. The sealing element may be formed from liquid sealant material that has been solidified. The term liquid is intended to cover sealant in a plastic and/or malleable state as well as sealant in a less viscous state. The sealing element may comprise an adhesive, a silicone based material or similar sealing material. The sealing element may be moulded before being assembled. Alternatively, the sealing element may be moulded into shape in situ. For example, a liquid sealant material may be deposited into a gap between the wheel rim and the tyre and then allowed to solidify (or set). The sealing element may be in the form of an elastomeric element, such as, for example, a rubber seal. The sealing element may be generally annular in shape and tapering in cross-section so that the thickness of the element reduces with radial distance from its centre.

Preferably, said region is defined by a multiplicity of flexible elements extending radially across the junction between the tyre and the rim. For example, brushes may be provided, which bridge a gap between the wheel rim and the tyre. Said region (the region that interfaces smoothly between the tyre and the wheel) may be defined by such brushes.

The shape of said region (the region that interfaces smoothly between the tyre and the wheel) is advantageously maintained throughout the approach of the aircraft when landing. On touching down, the aircraft generates a significant amount of noise and reducing the noise generated by air flowing past the wheels may no longer be important. Thus, the region between the wheel rim and the tyre may change shape significantly after touchdown. The region is preferably stiff enough not to change shape significantly during normal flight, but flexible enough that the shape of the region changes on touchdown (and preferably so flexible that the shape of the region when the aircraft is at a standstill on the ground is significantly different from when the aircraft is airborne). The tyre and the wheel rim may for example be so shaped that there is a need for a gap to be present between the tyre and the wheel rim when landing to allow for deformation of the tyre without causing undesirable local wear of the tyre at a position between the wheel rim and the periphery of the tyre. It may for that reason be advantageous for at least a portion of said region to be so configured to be deflected from, or otherwise forced out of, a gap that said region bridges when the aircraft lands. The region if configured to be so movable, is advantageously also configured such that once the aircraft is airborne again said at least a portion moves back to the position in which it bridges the gap.

At least a portion of said region may be so configured that, once the force between the wheels and the ground exceeds a given threshold force, for example on touchdown, it moves out of a gap that said region bridges when the aircraft is airborne. The threshold force may be less than or equal to the weight supported by the wheel when the aircraft is unloaded and stationary on the ground.

Said at least a portion of said region may also be so configured that, once the force between the wheels and the ground drops to or below a given threshold force, for example after the aircraft has lifted off the ground during take-off, said at least a portion moves back to the position in which it bridges the gap. Said threshold force may be the same as the threshold force first mentioned above.

The threshold force is preferably greater than zero, but could be close to or equal to zero. The threshold force may be between 0.01 and 0.5 times the weight supported by the wheel when the aircraft is unloaded and stationary on the ground.

Said region is preferably defined at least partly by an elastically deformable material. The material is preferably chosen such that the deforming of such material during normal usage is reversible (i.e. substantially elastic deformation) so that the region does not deteriorate after only a few series of take-offs and landings.

Said region is preferably so arranged and configured that the tyre may be inspected adequately whilst the aircraft is on the ground and the tyre is mounted on the wheel. It is particularly important, insofar as this preferred feature is concerned, that the side wall portion of the tyre immediately adjacent to the wheel rim may be inspected for wear and/or damage. At least part of said region may be configured to be movable for this purpose. For example, a part of the region bridging a gap between the wheel rim and the tyre, thereby hiding the portion of the wheel behind said part of the region, is advantageously flexible, and preferably resiliently flexible, and is so arranged that said part may be moved manually to reveal the portion of the tyre that is otherwise hidden from view. Advantageously, the part of the region that is moveable to facilitate inspection of the tyre is able to be moved to reveal the portion of the tyre that is otherwise hidden from view without requiring said part to be separated from the wheel. For example, said part may be moved by lifting the periphery of the region thereby bending the region. Such an action may for example be considered as peeling back the region to reveal the tyre underneath. Said part of said region may for example be in the form of a resiliently mounted sealing element and/or in the form of a sealing element as described above. Said part of said region may alternatively be in the form of brushes as described above.

Said region may be defined by a part of the tyre. The tyre may therefore be specially shaped so that, once positioned on the wheel rim, there is no significant gap or discontinuity between the tyre and the wheel rim. Alternatively, said region may be defined by a part of the wheel rim. The wheel rim may therefore be specially shaped so that, once a tyre is positioned thereon, there is no significant gap or discontinuity between the tyre and the wheel rim. Of course, said region may be defined partly by a part of the tyre and partly by a part of the wheel rim.

The wheel may include a hub cap. The hub cap may extend to the junction between the wheel rim and the tyre. The surface, presented to the airflow, of the rim may be defined by the hub cap. Said region may be defined at least in part by a part of the hub cap. For example the hub cap may have an outer portion in the form of a flexible sealing member that extends radially outwardly from the periphery of an inner portion of the hub cap.

As mentioned above said region may be defined by a part of the wheel (possibly comprising at least a part of a hub cap of the wheel) and/or part of the tyre and/or a separately provided element, such as for example a sealing element. Said region may extend significantly beyond the immediate vicinity of the junction between the tyre and the rim. For example, said region may cover an area of greater than 5% of the wheel area (equal to $\pi R^2$ where R is the radius of the tyre when in the air). Preferably, said region covers more than 10% of the wheel area and more preferably more than 20% of the wheel area and yet more preferably more than 40% of the wheel area.

It is stated above that at least one side of the wheel includes said region. Preferably, said at least one side is the side of the wheel opposite to the side which is configured to receive the axle. Both sides of the wheel may be arranged in accordance with the present invention. Thus, the region at the junction between the tyre and the rim may be shaped such that on both sides of the wheel, during use of the landing gear on an aircraft when airborne and the landing gear is in a position ready for landing of the aircraft, the surface of said region interfaces smoothly with the surfaces, presented to the airflow, of both the tyre and the wheel.

The aircraft landing gear may be fixed in position. Alternatively, the landing gear is movable from a stored position to an operative position. The present invention has particular application to aircraft wherein the landing gear is moveable between a stowed (stored) position and a deployed (operative) position. Aircraft having landing gear that are fixed in position are generally not designed with noise reduction in mind. The invention is of greater application to larger aircraft, particularly passenger-carrying aircraft, where noise reduction on landing of the aircraft is of greater relevance. The landing gear is preferably of a size suitable for use on an aircraft designed to carry more than 50 passengers, and more preferably more than 100 passengers. Such aircraft generally have retractable landing gear assemblies.

According to a further aspect of the invention there is provided an aircraft landing gear including a wheel having a rim around which there is mounted a tyre, wherein, on at least one side of the wheel, during use of the landing gear on an aircraft when airborne and the landing gear is in a position ready for landing of the aircraft, the surface of the wheel/tyre assembly presented to the airflow within the region bounded by the widest part of the tyre is substantially smooth in shape and preferably substantially planar (the widest part being measured in a direction parallel to the axis of the tyre). Other features of the invention described herein may of course be incorporated into this aspect of the present invention. For example, features described with reference to said region as described above may be incorporated as if applied to said region of this embodiment.

The present invention also provides a landing gear for an aircraft according to any aspect of the above-described invention. Thus, there is provided an aircraft landing gear including a wheel having a rim around which there is mounted a tyre, wherein the region at the junction between the tyre and the rim is shaped such that on at least one side of the wheel, during use of the landing gear on an aircraft when airborne and the landing gear is in a position ready for landing of the aircraft, the surface of said region interfaces smoothly with the surfaces, presented to the airflow, of both the tyre and the wheel.

The present invention also provides a method of reducing noise caused by landing gear on an aircraft, for example during approach of the aircraft on landing, including a step of manufacturing a landing gear according to any aspect of the above-described invention. Such a method advantageously includes a step of modifying an existing design in order to reduce noise caused by the landing gear.

There is also provided a wheel rim and/or tyre for use in the landing gear according to the present invention, wherein the wheel rim and/or tyre includes said region. There is yet further provided a component, such as a sealing element for example, for use in the landing gear according to the present invention, the component advantageously being in the form of a separate component as described herein.

Embodiments of the present invention will now be described by way of example with reference to the following schematic drawings of which:

FIG. 1a shows a cross-section of a wheel and tyre according to a first embodiment of the invention;

FIG. 1b is an enlarged portion of FIG. 1a illustrating more clearly the parts of the wheel at the junction between the rim of the wheel and the tyre;

FIG. 2 shows an aircraft having a landing gear including a wheel as shown in FIGS. 1a and 1b.

FIG. 3a shows a cross section of a wheel according to a second embodiment of the invention;

FIG. 3b is an enlarged portion of FIG. 3a illustrating more clearly the parts of the wheel at the junction between the rim of the wheel and the tire;

FIG. 4 shows a partial cross section of a wheel according to a third embodiment of the invention.

Figure 5A:
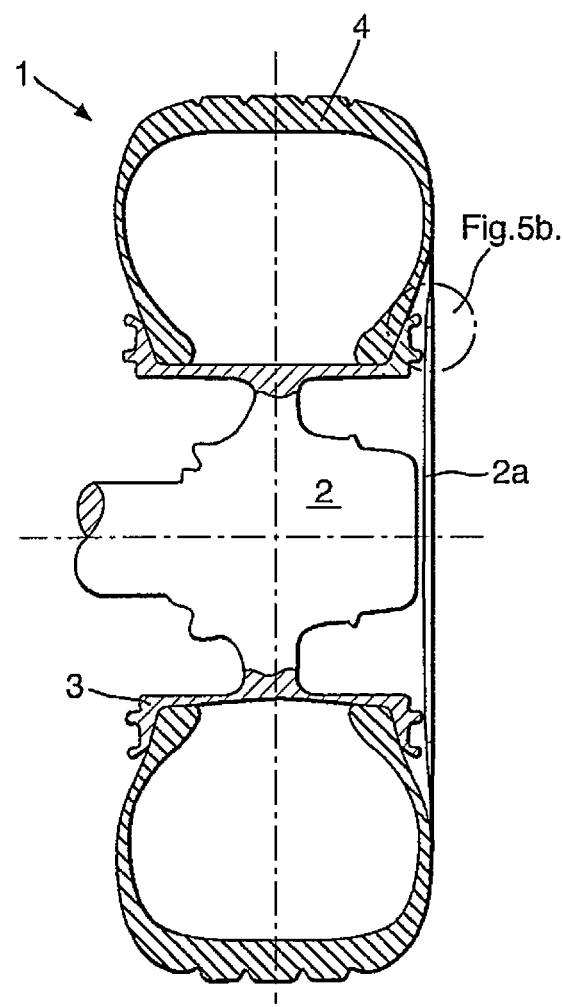
FIGS. 5a, 5b and 5c illustrate schematically a wheel according to an alternative embodiment of the present invention.

FIG. 1a shows a cross-section of a wheel 1 according to a first embodiment. The wheel 1 comprises a hub 2 and a wheel rim 3. A tire 4 is held in place on the wheel rim 3 by means of circumferential flanges 5. The tire 4 is generally toroidal in shape and has a cross-sectional profile that is generally U-shaped. The arms of the U-shaped cross-section are defined by the sides 4a of the tire 4 and the base from which the arms extend are defined by the portion 4b of the tire that contacts the ground. The cross-sectional shape of the wheel rim 3, and in particular of the flanges 5, is such that the innermost part of the tire 4 (the innermost portion of the tire defined by the free end of the sides 4a of the tire 4) is held between opposing flanges 5 by means of the opposing innermost portions of the tire 4 being resiliently urged apart as a result of the shape of the tire 4 when in a relaxed state. The gap 6 defined between the innermost portion of the tire 4 and the wheel rim 3 is filled by means of an annular resilient rubber sealing element 7. FIG. 1b shows a portion 10 of FIG. 1a magnified for the sake of illustrating the shape of the sealing element 7 (which is not shown in FIG. 1a for the sake of clarity). The sealing element 7 has a generally triangular cross-section. A first side 7a of the generally triangular shape follows the shape of the tire 4. A second side 7b of the generally triangular shape follows the shape of the wheel rim 3. The third side 7c of the triangle follows the notional surface that smoothly envelopes the wheel 1 in the region of the junction between the tire 4 and the wheel rim 3. The third side 7c extends between junction 7d of the first side 7a and the third side 7c and junction 7e of the second side 7b and the third side 7c The sealing element 7 thus bridges the gap 6.

The wheel 1 includes a hub cap 2a (seen most clearly in FIG. 1b) that covers the hub 2 and extends just up to the outermost part of the wheel rim 3 (defined by flanges 5). The shape of the wheel hub cap 2a is such that the whole side 1a of the wheel 1 is substantially smooth, generally flat and has substantially no unnecessary discontinuities or gaps.

FIG. 2 shows an aircraft 8 including a landing gear 9 including wheels 1 being configured as described with reference to FIG. 1. When the aircraft is airborne, the sealing element 7 is in the position shown in FIG. 1. When landing the smooth surface resulting from the provision of the sealing element 7 generates less noise than would be generated if no sealing element 7 were provided. It is believed that this reduction in noise is achieved because the wheel generates less turbulent airflows and because air flows relatively smoothly across the side 1a of the wheel 1. On touchdown, the tyre 4 deforms significantly by virtue of the increased pressure within the tyre 4 resulting from the increased weight supported by the wheel 1 and therefore the tyre 4. The sealing element 7, being resilient, deforms with the tyre 4, and therefore does not cause any damage to the tyre 4 when the aircraft 8 is on the ground. The sealing element 7 is removable to allow inspection of the portion of the tyre 4 that would otherwise be hidden from view. After the tyre has been inspected the sealing element 7 can simply be pushed back into position.

FIG. 3a shows a cross section of a wheel 1 according to a second embodiment, the wheel being generally of the same construction as that illustrated in FIG. 1a (such that the same reference numerals are used in FIG. 3a to represent the parts that are common to FIGS. 1a and 3a). Thus the wheel 1 comprises a hub 2, hub cap 2a, which has a substantially flat outer face, and wheel rim 3. A tyre 4 is held in place by means of flanges 5 of the wheel 1. FIG. 3a also shows an axle 14 on which the wheel 1 is mounted (there being a single hub cap 2a). A flexible annular rubber sealing member 13 extends radially from, and substantially in the same plane as, the rigid hub-cap 2a. A magnified view of a portion 11 of FIG. 3a is shown in FIG. 3b, to illustrate more clearly the shape of the sealing member 13. The sealing member 13 tapers radially outwardly from an inner thick root 13a to its thin free end 13b. The hub cap 2a and the sealing member 13 define a smooth and flat surface having a normal generally parallel to the axis of the tyre 4, the surface covering the portions of the wheel 1 and tyre 4 within the area defined by the tyre 4 at its widest. The surface of the wheel/tyre assembly, on the side opposite to the axle 14, presented to the airflow on landing is therefore substantially planar. Moreover, the hub cap 2a and sealing member 13 cover the voids 12 that would otherwise be presented to the airflow. In a manner similar to the sealing element 7 of the first embodiment, the sealing member 13 is flexible enough that it does not interfere with the tyre/wheel assembly on landing and also is moveable (by lifting the thin end 13b of the sealing member 13 away from the tyre 4) to facilitate inspection of the tyre 4.

FIG. 4 shows, on the right hand side of FIG. 4 (to the right of the broken line 18 in FIG. 4), a partial cross-section of a wheel 15 and tyre 16 according to a third embodiment the left hand side of FIG. 4 illustrating the shape of a wheel 15' and tyre 16' assembly having a shape according to a design not in accordance with this embodiment of the present invention (to aid identification of the important features of the third embodiment). The wheel 15 includes a rigid hub cap 2a that extends up to and over the rim 17 of the wheel 15, thereby covering the area defined within the rim 17, the outer surface of the hub cap 2a being substantially flat. The wheel rim 17 and the tyre 16 each have a shape such that there is substantially no void at the junction between the wheel rim 17 and the portion 16c of the tyre 16 adjacent thereto. The wheel 15 therefore interfaces smoothly with the tyre 16 in the region of this junction. Also it will be noted that the side 16a of the tyre 16 has a relatively flat profile that defines a surface that is substantially in the same notional plane as the outer surface of the hub cap 2a. By way of comparison, the left hand side of FIG. 4, showing an equivalent construction without features of the third embodiment, shows the junction between the tyre 16' and the rim 17' of the wheel 15' and that in the region of this junction there is a significant discontinuity 19' between the rim 17' and the portion 16c' of the tyre 16' adjacent thereto. Also, the width of the tyre 16' tapers to either side of its widest portion 16d'. Thus, even if a flat hub cap were fitted over the hub and the wheel rim 17' there would be a generally concave region defined within the region defined by the taper from the widest part 16d' of the tyre 16'. Such a concave region could itself generate unwanted noise (even without the noise contributed by the discontinuity 19').

Figure 5B:
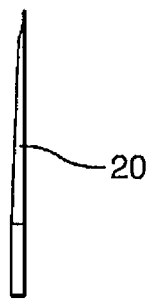
Figure 5C:
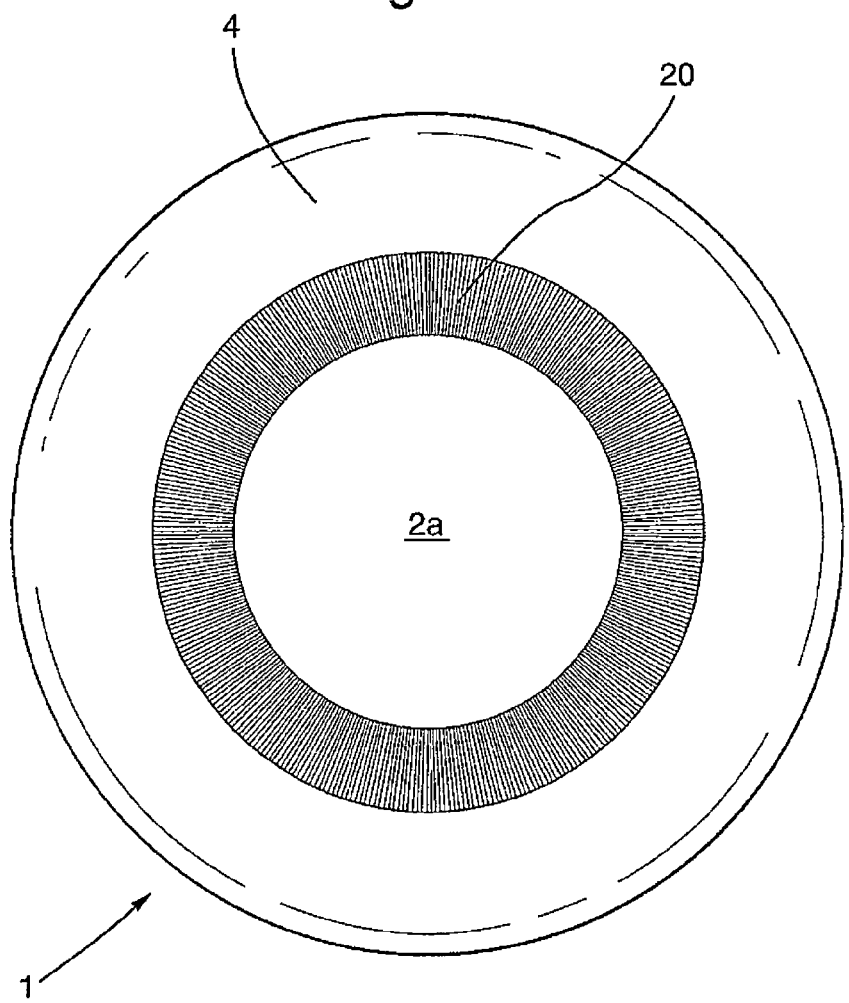

The function of the sealing element 7 of the first embodiment (or of the sealing member 13 of the second embodiment) could be achieved by means of a multiplicity of flexible elements extending radially across the junction, such as brushes having resiliently deformable bristles aligned radially with respect to the axis of the tire 1 (i.e. in a radial direction from the axis). Such an alternative is shown in FIGS. 5a, 5b and 5c, which show the wheel 1, the hub 2, hub cap 2a, the rim 3, the tire 4, and the flexible elements 20. The rubber sealing element 7 of the first embodiment could be replaced with flexible adhesive or gel or other suitable sealing material.

Whilst the side 1a of the wheel 1 in the embodiments described above has substantially no discontinuities, the wheel 1 may include certain features requiring such discontinuities to be provided, for example in the form of small apertures or protrusions. Such discontinuities may contribute to the noise generated by the wheel 1 travelling through the air, but the reasons for providing such features may outweigh the benefits of the greater reduction in noise that might be achieved if such features were not provided. It is however envisaged that the provision of such features would not interfere with the benefits provided by the above-described embodiment in terms of noise reduction gained by the provision of the sealing element (or by means of the smoothing of the junction between the wheel rim and the tyre).

The invention claimed is:

1. An aircraft comprising a landing gear moveable between a stowed position and a deployed position, the landing gear including a wheel/tire assembly, said wheel/tire assembly including a wheel having a rim around which there is mounted a tire, wherein
   (a) the tire and the rim are each so shaped that a gap is defined between a surface of the rim and a surface of the tire,
   (b) a separate part is provided at the junction between the tire and the rim, and
   (c) said separate part has
      (i) a first surface that abuts the tire,
      (ii) a second surface in contact with the rim, and
      (iii) a third surface which extends between the first surface and the second surface, so as to provide a surface to smooth and close the gap in the region of the junction between the tire and the wheel rim,
   whereby on at least one side of the wheel, during use of the landing gear on an aircraft when airborne and the landing gear is in a position ready for landing of the aircraft, the third surface of said separate part acts to reduce the noise that would result in the absence of the separate part from the interaction of the gap and the airflow during approach of the aircraft on landing and wherein
   (d) on at least one side of the wheel during use of the aircraft when airborne and the landing gear is in a position ready for landing of the aircraft, the surface of the wheel/tire assembly presented to the airflow across the part bounded by the widest part of the tire is substantially flat.

2. An aircraft according to claim 1, wherein at least a portion of said separate part is flexible and so arranged that it may be moved manually to reveal a portion of the tire that is otherwise hidden from view.

3. An aircraft according to claim 1, wherein said separate part is defined at least partly by an elastically deformable material.

4. An aircraft according to claim 1, wherein said separate part is defined by a multiplicity of flexible elements each extending radially across the junction between the tire and the rim.

5. An aircraft according to claim 1, wherein said region is defined by brushes, which bridge the gap between the wheel rim and the tire.

6. An aircraft according to claim 1, wherein at least a portion of said separate part is so configured that, once the force between the wheels and the ground exceeds a first given threshold force, it moves out of the gap that said separate part bridges when the aircraft is airborne, and once the force between the wheels and the ground drops to or below a second given threshold force, it moves back to the position in which it bridges the gap.

7. An aircraft according to claim 1, wherein said separate part is defined by a sealing element, which bridges the gap between the wheel rim and the tire.

8. An aircraft according to claim 7, wherein the sealing element is formed from liquid sealant material that has been solidified.

9. An aircraft according to claim 1, wherein the separate part is disposed on both sides of the wheel such that, during use of the landing gear on an aircraft when airborne and the landing gear is in a position ready for landing of the aircraft, the surface of each separate part interfaces smoothly with a surface, presented to the airflow, of the tire and a surface, presented to the airflow, of the wheel.

10. An aircraft according to claim 1, wherein said separate part is defined by a separate component part of the wheel.

11. An aircraft according to claim 1, wherein the aircraft is of a size suitable for carrying more than 50 passengers.

12. An aircraft according to claim 1, wherein the first surface follows the shape of the tire.

13. An aircraft according to claim 1, wherein the second surface follows the shape of rim.

14. An aircraft according to claim 1, wherein the surface of the wheel/tire assembly presented to the airflow, within the part bounded by the widest part of the tire is substantially planar.

15. A retractable aircraft landing gear including a wheel/tire assembly, said wheel/tire assembly including a wheel having a rim around which there is mounted a tire, wherein the wheel further includes at least one part that smoothly envelopes the junction between the tire and the rim, said at least one part being shaped such that on at least one side of the wheel, during use of the landing gear on an aircraft when airborne and the landing gear is in a position ready for landing of the aircraft, a surface exposed to the airflow of said at least one part interfaces smoothly between a surface, exposed to the airflow, of the tire and a surface, exposed to the airflow, of the wheel so that in use the flow of air past said at least one part is streamlined and wherein on at least one side of the wheel when the landing gear is in a position ready for landing of the aircraft, the surface of the wheel/tire assembly presented to the airflow across the part bounded by the widest part of the tire is substantially flat.

16. A method of reducing noise caused by an aircraft during approach of the aircraft on landing including a step of modifying an existing design of an aircraft in order to reduce noise caused by the landing gear of the aircraft, and a step of manufacturing an aircraft according to claim 1.

\* \* \* \* \*